United States Patent [19]

Whitener

[11] Patent Number: 4,695,499
[45] Date of Patent: Sep. 22, 1987

[54] BEADING PROFILE STRIP
[75] Inventor: Gary Whitener, Paramount, Calif.
[73] Assignee: Trim-Lok, Inc., Paramount, Calif.
[21] Appl. No.: 902,221
[22] Filed: Aug. 29, 1986
[51] Int. Cl.$^4$ ................................................ B32B 1/04
[52] U.S. Cl. .................................... 428/122; 428/358; 428/138; 49/490; 52/716
[58] Field of Search ........................ 428/122, 358, 138; 49/490; 52/716

[56] References Cited

U.S. PATENT DOCUMENTS 2,746,103 5/1956 Bright .
2,794,757 6/1957 Bright .
3,167,856 2/1965 Zoller .
3,222,769 12/1965 Le Plae .
4,105,814 8/1978 Eggert .

FOREIGN PATENT DOCUMENTS 2006309 5/1979 United Kingdom .

Primary Examiner—Alexander S. Thomas
Attorney, Agent, or Firm—Thomas I. Rozsa

[57] ABSTRACT

A beading profile strip or trim strip comprises an extruded resilient member disposed about a metallic core formed into a U-shaped channel member having one or more sheet engaging structures for gripping the edge of a sheet or blade, such as a car door. The engaging structures comprise a downward angled leg having a foot attached thereto, and a downward angled stop adjacent to and above the leg, for frictional engagement of the sheet. The strip is easy to install, but difficult to remove.

12 Claims, 15 Drawing Figures

BEADING PROFILE STRIP

BACKGROUND OF THE INVENTION

1. FIELD OF THE INVENTION

The present invention relates to a beading structure for application to the edge of rigid sheets, such as a car door, for ornamental or protective purposes. More particularly, the present invention relates to a beading structure that is easy to mount, but is difficult to remove.

2. DESCRIPTION OF THE PRIOR ART

Prior art U-shaped channel type beading for protecting or decorating the edge of a panel, such as a metal sheet, a car door, and so forth, is known in the prior art. For example, U.S. Pat. No. 3,167,856, to Zoller, discloses a strip structure for protecting the edge of a metal structure, such as a car door, and includes clamping ribs or lifts that are deformed when the strip is pressed onto the edge of a panel, and which frictionally engage the panel to retain the strip thereon. The clamping ribs of Zoller, however, are too close to the opposite internal sidewall of the strip, and nearly touch the sidewall in the equlibrium position of the strip, causing significant interference with the panel edge and making it difficult to install. In all protective edge strips of this type, a strip that is too difficult to install, that is, one that requires more than about two pounds of force per linear inch, is, in practice, often not installed properly, leading to failure in the field. Furthermore, difficult installation often leads to excess deformation of the strip during installation, which permanently distorts the strip and reduces the force required to remove it, often causing the strip to fall off the edge it is installed on. Moreover, the limited gripping power of such a strip makes removal of the strip too easy, leading to an application that is not permanent, and may inadvertently disengage from the protected edge, even when it is properly installed.

U.S. Pat. No. 4,105,814 to Eggert discloses a U-shaped cross-section strip, having two spaced apart arms connected by a base, for protecting the edge of an automobile door or similar panel. Eggert discloses a number of embodiments, having inwardly projecting two-part tangs for retaining the strip on the protected surface. The structure of Eggert is, however, more complicated than required, which severely increases quality control expense and generally makes it more expensive to produce. Furthermore, Eggert does not conveniently allow symmetric beading. The strip of Eggert causes significant interference between the two-part tangs and the protected edge during installation, making the installation difficult and subject to the same shortcomings as Zoller. During removal, however, the auxiliary tang does not interact with the other tang, so the profile strip is not significantly more difficult to remove than it is to attach.

In many applications it is desired to install such beading or profile strip permanently. In addition, in many applications it is desirable that the strip present a symmetric appearance along the edge of the protected member. It is highly desirable that the strip be easy to apply, but difficult to remove. Furthermore, it is desirable that the strip can be removed without marring the material it is applied to.

Therefore, a significant need exists for a beading strip that presents a symmetric appearance, that is easy to apply, but difficult to remove, that can be removed without marring the material, but that is permanent unless intentionally removed.

SUMMARY OF THE PRESENT INVENTION

It is an object of the present invention to provide a beading profile strip that is easy to mount on a marginal edge portion of a flange or sheet, and is difficult to remove.

It is a further object of the present invention to provide a beading profile strip that will not mar a finished surface.

It is a further object of the present invention to provide such a beading profile strip that is symmetric.

It is a further object of the present invention to provide a beading profile strip that is flexible, both laterally and longitudinally.

It is a further object of the present invention to provide a beading profile strip that may be manually mounted without the use of any tools.

It is a further object of the present invention to provide a beading profile strip that is inexpensive and relatively simple to manufacture.

Accordingly, the present invention provides an elongated beading profile strip for mounting on the edge of a sheet or flange for ornamental or protective purposes. The beading profile strip is defined by a body of rubberlike material, which may include polyvinyl chloride or other materials having similar physical characteristics, having a centrally disposed semi-rigid core, that is formed into a generally U-shaped channel, and having a plurality of legs that project into the channel. The semi-rigid metallic core tends to maintain a uniform cross-section throughout the channel, even after mounting on an edge. The legs project inwardly and downward, that is, toward the bottom of the U-shaped channel, allowing an edge portion of a sheet to be inserted relatively easily by deforming the legs downward. Because the legs are inclined downward, to remove the beading the legs must be deformed by flexing upward, which is more difficult. In addition, each leg terminates in a foot that provides a large frictional surface, which engages the sheet during removal.

Further increasing the difficulty of removing the beading profile strip is a stop located above and adjacent and parallel to each leg, projecting inwardly and downward from the sidewall of the beading profile strip, at the same angle that the leg projects downward, against which the leg is forced during removal of the sheet. Finally, the foot, which articulates at the ankle which ankle attaches the foot to the leg, must be compressed sufficiently to allow the foot to be squeezed between the sheet and the strip.

At the same time, however, installation of the profile beading strip according to the present invention is relatively easy, and is in fact much easier than removal of the profile beading strip for two reasons. First, there exists a gap between the foot on one side of the channel and the opposing structure on the opposite side of the channel, which, depending on the particular embodiment employed, may be the opposing sidewall of the channel, or another leg and foot structure. Second, the downward angle that the leg projects at makes it naturally easier to deform the leg downward, as it must be deformed during installation, than it is to deform the leg upward.

Further novel features and other objects of the present invention will become apparent from the following

DESCRIPTION OF THE PREFERRED EMBODIMENTS

Figure 1:
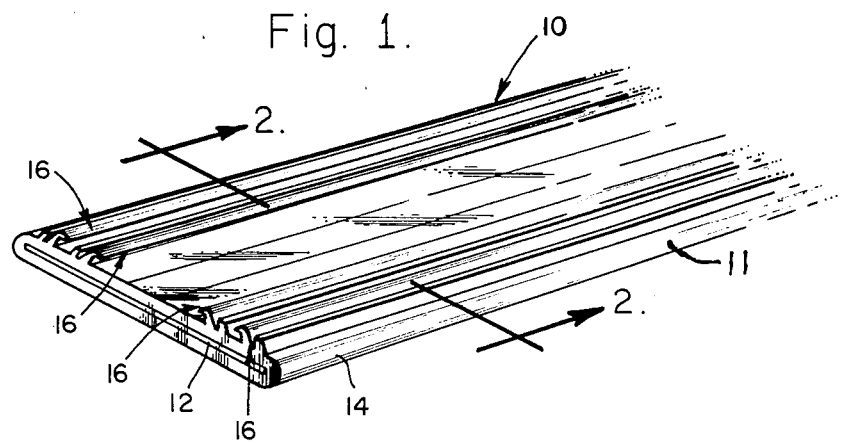
FIG. 1 is a perspective view of a beading profile strip according to the present invention prior to being bent into a channel shape.

Referring to FIG. 1, there is shown a beading profile strip 10 consisting of an elongated strip 11 of a rubber-like material, such as rubber or poyvinyl chloride, or the like, having a semi-rigid metallic core 12, embedded within the strip.

Figure 13:
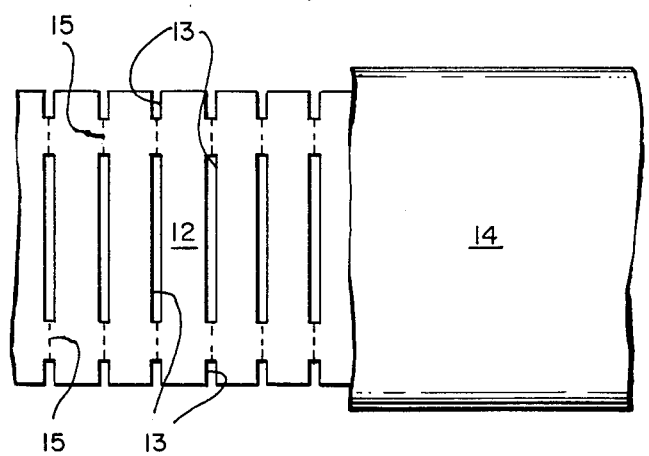
FIG. 13 is a plan view of the metallic core strip used in forming the core of a beading profile strip according to the present invention.

Semi-rigid metallic core 12 is a unitary strip that is embedded within beading profile strip 10, during the manufacturing process, which is preferably an extrusion process such as those well-known to persons skilled in the art. As illustrated in FIG. 13, metallic core 12 is formed of a unitary strip, having a plurality of regularly spaced apart parallel slits 13 cut into throughout its length, with slits 13 being cut perpendicular to the length of metallic core 12. Slits 13 nearly sever the core into small pieces, but a thin web 15 of metal disposed along each edge of metallic core 12 maintains the unitary integrity of metallic core 12.

After the resilient coating is extruded about the core, and the resulting profile beading strip is formed to its final shape, the strip is flexed, as by running it over a roller of suitable radius, to break webs 15, leaving a multiplicity of largely independent core members inside the profile beading strip, which greatly increases the lateral flexibility of the finished product. This type of severed metallic core is well known in the prior art. Any of a number of metals may be used. A preferred material for making metallic core 12 according to the present invention is aluminum or steel sheet metal having a thickness of about 0.010 to about 0.040 inches.

Figure 2:
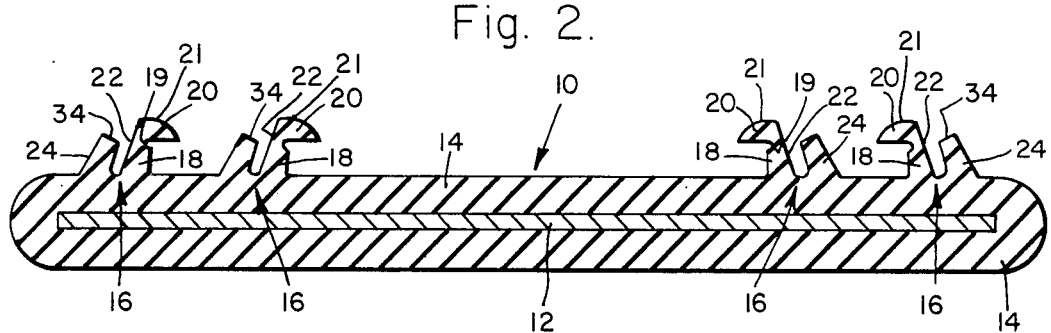
FIG. 2 is a sectional side elevation of the strip shown in FIG. 1, taken along the lines 2—2 of FIG. 1.

Outer body 14 of beading profile strip 10, comprising a resilient coating about metallic core 12, includes four sheet engaging members 16, that run the length of beading profile strip 10. After the initial steps of the manufacturing process, beading profile strip 10 is a flat rectilinear strip, as illustrated in FIGS. 1 and 2.

Beading profile strip 10 is then formed by a transverse forming operation into the U-shaped channel configuration, according to methods well known to those skilled in the art.

Figure 3:
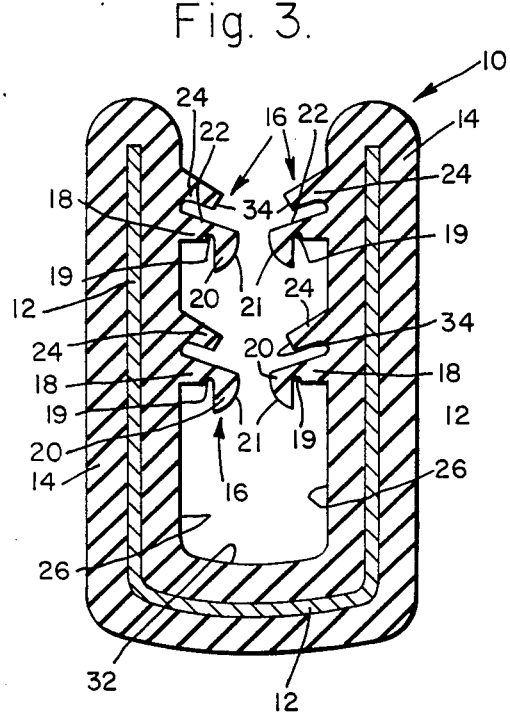
FIG. 3 is a sectional side elevation of the strip shown in FIG. 1 after it has been formed into a channel shape.

Referring to FIG. 3, sheet engaging members, shown generally at 16, are each identical and consist of legs 18, each terminating in a foot 20 attached to each respective leg 18 by ankle 19. Each ankle 19 includes a downward concave portion along its lower edge, providing a link between leg 18 and foot 20 that is weaker than leg 18, but allows foot 20 to articulate up and down more easily than leg 18 itself could bend up and down. Each foot terminates in curved surface 21 for engaging the sheet progressively as the sheet is removed from the beading.

Each leg 18 includes a straight-line upper surface 22, which is directed inwardly into the channel and downward at an angle of from about 10° to about 75° from the horizontal. Adjacent to, and immediately above (as illustrated in the figures) leg 18 is stop 24, which projects inwardly and downward relative to the channel. Stop 24 may be inclined at any desirable angle within the range of from about 10° to about 75°. The downward inclination of stop 24 may be at the same angle as the downward inclination of leg 18, but this is not necessary. Stop 24 is shorter than leg 18, by approximately the width of foot 20, terminating substantially along a vertical line running through ankle 19. Both foot 20 and stop 24 originate from the plane of the sidewall 26 of the channel in beading profile strip 10.

In use, it is intended that a beading profile strip 10 according to the present invention will have predetermined dimensions for being mounted on sheets of predetermined thickness in such a manner that in normal installation and removal stops 24 do not touch sheet 30. Sheet 30 represents any surface to be protected or decorated along an edge.

Figure 4:
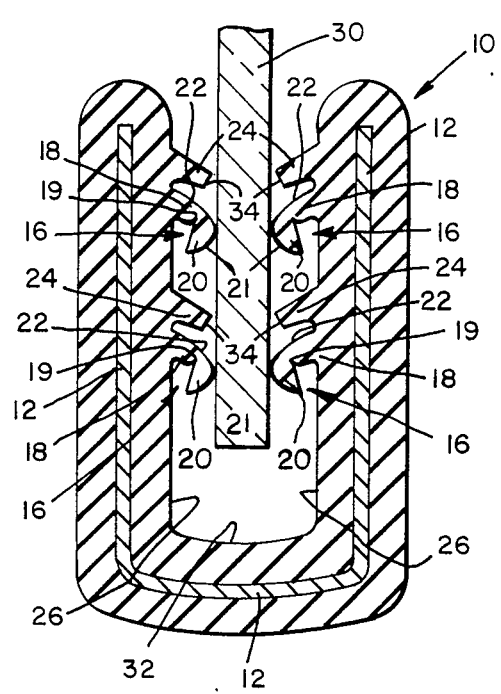
FIG. 4 is a sectional side elevation of the strip of FIG. 3 installed on the edge of a sheet.

Referring to FIG. 4, there is illustrated beading profile strip 10 mounted on sheet 30, which is accomplished by pushing beading profile strip 10 upward, or sheet 30 downward, until strip engaging members 16 fully engage strip 30, or until the edge of strip 30 abuts the bottom interior portion of the channel 32 of beading profile strip 10.

While profile beading strip 10 is being mounted, legs 18 are deflected downward. Their generally resilient nature urges legs 18 back toward their original position, that is, upward, thereby exerting a frictional clamping force on sheet 30.

Figure 5:
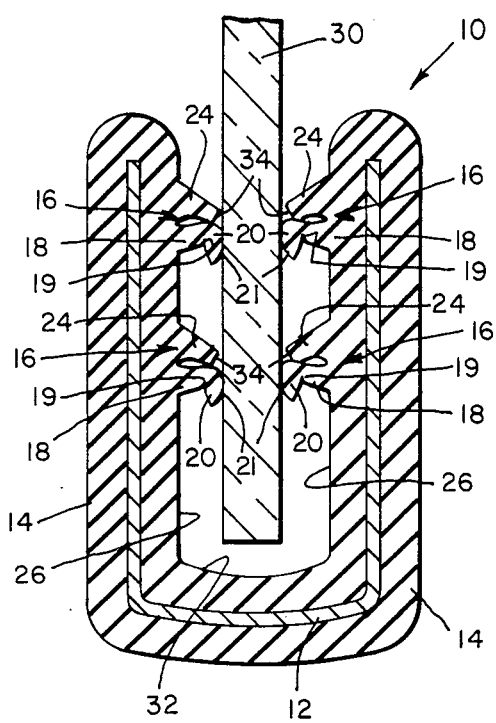
FIG. 5 is a sectional side elevation of the strip of FIG. 3 illustrating the configuration of the strip as the sheet is moved outwardly from the channel.

When a force that would dismount profile beading strip 10 from sheet 30 is applied, as illustrated in FIG. 5, characteristics of profile beading strip 10 operate to make the removal much more difficult than the installation. First, legs 18 must be deflected upward, out of their normal downward inclined alignment, which requires greater force than deflecting them downward in the direction of their natural alignment. Secondly, as each leg 18 is deflected upward, a greater surface area of foot 20 engages sheet 30, increasing the surface area of engagement between beading profile strip 10 and sheet 30, and thereby making available a greater potential frictional force.

Then, when leg 18 is deformed to a level just above the horizontal plane, the back or top portion of leg 18 engages stop 24 at ankle 19. Stop 24 is sufficiently thick and resilient that it does not deflect very much. Therefore, end 34 of stop 24 acts as a fulcrum against which ankle 19 must pivot, allowing foot 20 to rotate upward, be compressed between sheet 30 and stop 24, be squeezed between sheet 30 and stop 24, to permit sheet 30 to be withdrawn.

These characteristics result in a succession of different configurations of sheet engaging members 16, as sheet 30 is removed from beading profile strip 10, which are successively illustrated in FIGS. 6 through 9. Semi-rigid metallic core 12 at all times tends to maintain the generally channel-shaped configuration of beading profile strip 10, providing the force required to generate frictional force through the engagement of feet 20 with sheet 30. (FIGS. 6 through 9, like the other side elevations, assume that sheet 30 is moving upward to be disengaged from beading profile strip 10, which is moving downward relative to sheet 30.)

Figure 6:
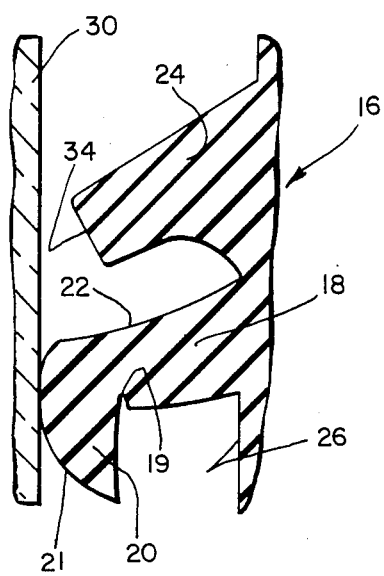
FIG. 6 is an enlarged sectional side elevation of one of the sheet engaging structures of the present invention, illustrating the deformation of the sheet engaging structure when the beading has been installed.
Figure 7:
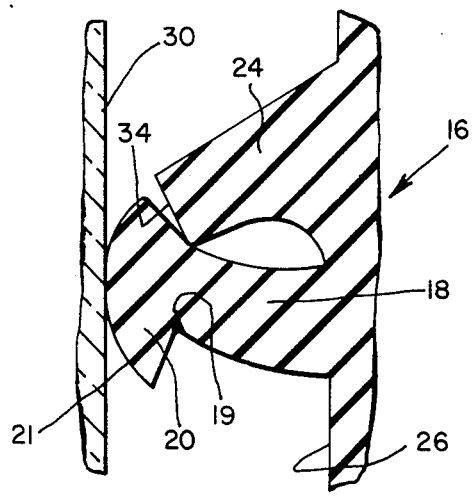
FIGS. 7, 8, and 9 are the same views as shown in FIG. 6, but illustrating the shapes assumed by the sheet engaging structures of the strip as the sheet upon which the strip is mounted is progressively withdrawn.
Figure 8:
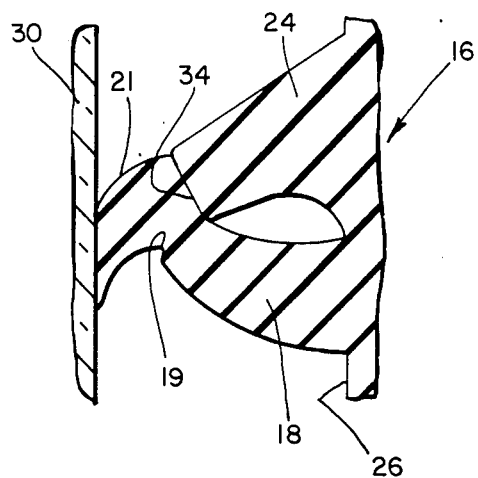
Figure 9:
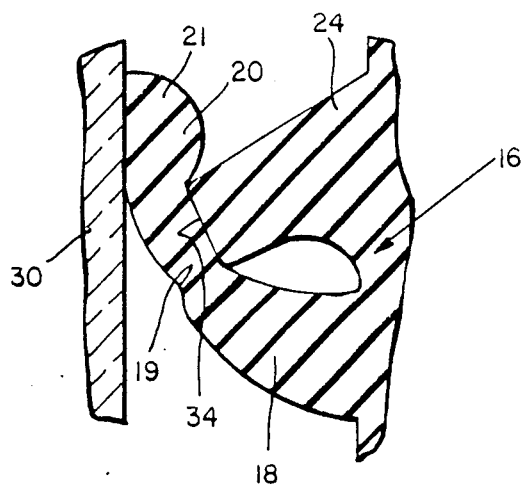

Referring to FIG. 6, leg 18 has been deflected upward to some extent, bringing a greater surface area of curved surface 21 of foot 20 into contact with sheet 30. In FIG. 7, the upward deflection of leg 18 is more apparent and the upper surface of leg 18 has engaged the lower corner of stop 24. In FIG. 8, the inner upper surface of leg 18 is contiguous with the end of stop 24, making further deformation of leg 18 substantially more difficult and further increasing the frictional surface of foot 20 that is in contact with sheet 30. Referring to FIG. 9, continued upward force on sheet 30 causes severe deformation of foot 20, which is now squeezed upward past the space between stop 24 and sheet 30 as ankle 19 allows foot 20 to be bent upward, so that most of foot 20 is now above the upper surface of leg 18. When the configuration of FIG. 9 is reached, removal of sheet 30 from beading profile strip 10 is relatively easier because the squeezing of foot 20 through the small space between stop 24 and sheet 30 has been accomplished, and the ability of leg 18 and stop 24, operating through foot 20, to exert additional friction inducing force on foot 20 is greatly diminished.

Figure 10:
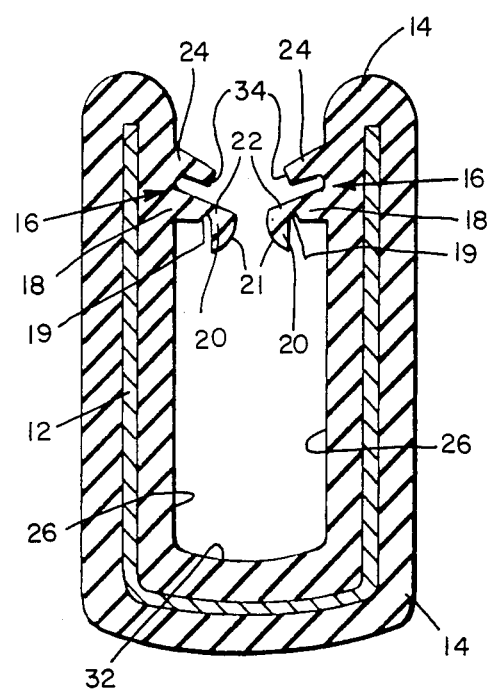
FIG. 10 is a sectional side elevation of another embodiment of a beading profile strip according to the present invention.

Referring to FIG. 10, there is shown an alternative embodiment of a beading profile strip according to the present invention, having two opposed sheet engaging structures 16 as described above. Sheet engaging structures 16 are conveniently located toward the open end of Channel 32, to permit some lateral movement of the closed end of Channel 32, relative to the engaged sheet (not shown). Naturally, sheet engaging structure 16 may be placed at any convenient point along the interior length of Channel 32.

Figure 11:
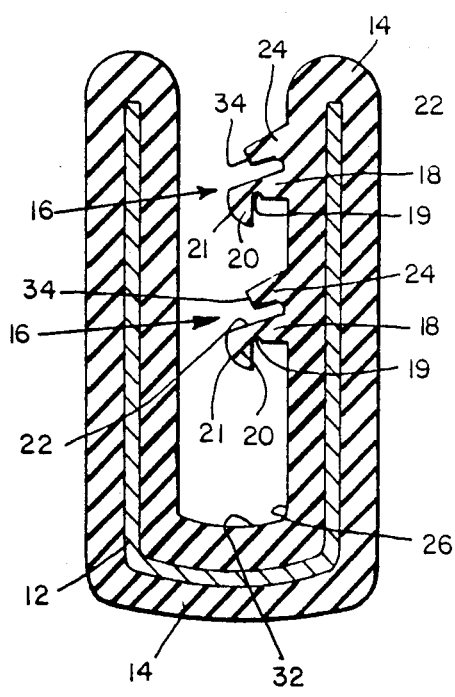
FIG. 11 is a sectional side elevation of still another embodiment of a beading profile strip according to the present invention.

Referring to FIG. 11, there is shown still another alternative embodiment of a profile beading stip according to the present invention, having two (2) sheet engaging structures as previously described, disposed on one side of Channel 32. Construction and operation of the embodiment disclosed in FIG. 11 is the same as described in great detail above in reference to FIGS. 1 through 9. The embodiment of FIG. 11 is useful when it is desirable to have one side of profile beading strip 10 as nearly flush with the engaged sheet as possible, to present a neater appearance.

Figure 12:
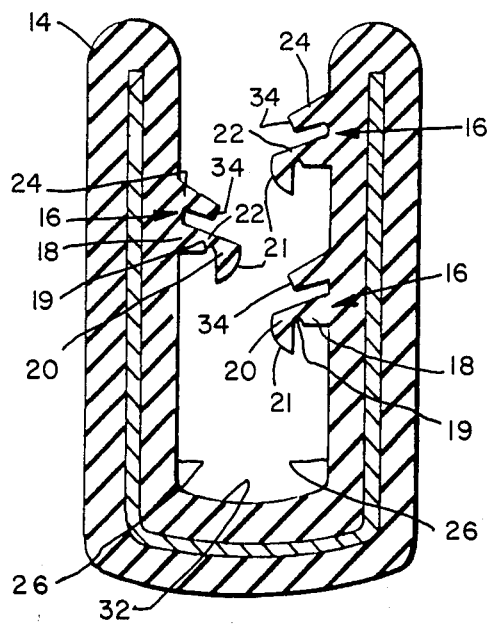
FIG. 12 is a sectional side elevation of still another embodiment of a beading profile strip according to the present invention.

Referring to FIG. 12, there is illustrated still another alternative embodiment of a profile beading strip according to the present invention, which includes two sheet engaging structures 16, spaced apart and parallel to each other, along one sidewall 26, with one sheet engaging structure 16 disposed on the other sidewall 26, such that said one sheet engaging structure 16 is disposed substantially in the middle of space between said two spaced sheet engaging structures 16 on the other sidewall 26. the embodiment of FIG. 12 is especially useful in applications where it is desirable to have an insertion force that is less than the insertion force required for the embodiment illustrated in FIG. 4.

Certain applications do not require rigid or semi-rigid beading profile strips, and it may at times be either feasible or desirable to provide a beading profile strip having no metallic core. In addition, it may be desirable to produce a beading profile strip 10 whose sheet engaging structures are made from a different material than outer body 14. This can be readily accomplished using dual extrusion techniques well known to those skilled in the art.

Figure 14:
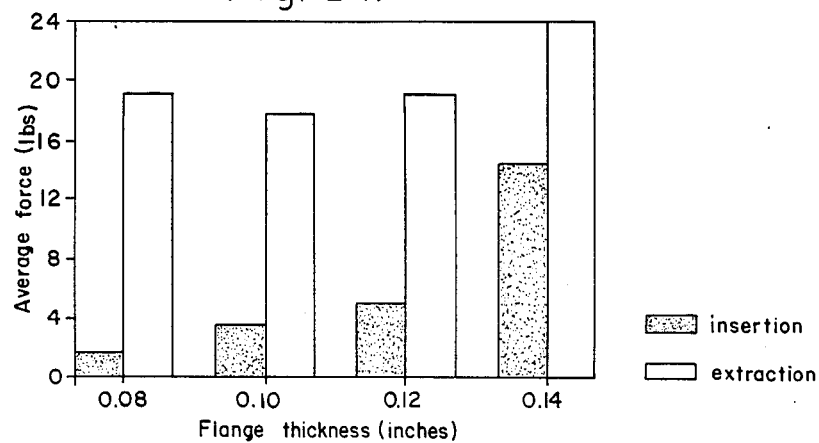
FIG. 14 is a chart in graph form showing force required to install and remove a beading profile strip according to the present invention.
Figure 15:
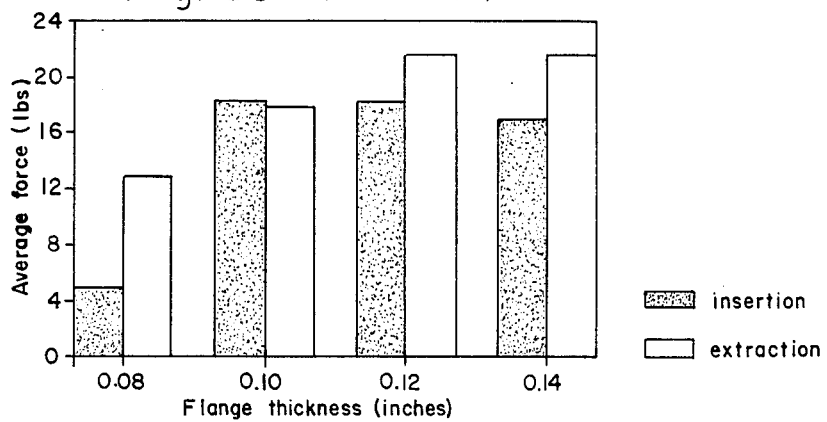
FIG. 15 is a chart in graph form showing force required to install and remove a beading profile strip according to the prior art.

In use, the present invention has proved extremely successful. A variety of sizes and styles of beading profile strip 10 according to the present invention have been produced and tested. Its ease of mounting and its difficulty of dismounting have been measured, as illustrated by the following examples, which restate the information provided in graph form by FIGS. 14 and 15.

The following conventional protocol was used in all the tests. A segment of the profile beading strip 120 mm long is grasped by a machine that installs and removes it from a stationary painted standard blade 100 mm long. The machine applies a force directly along the entire length of the beading strip. During insertion, the force is directed into the blade along the length of the bead, and during removal the force is directed outward from the blade. The peak force required to install and to remove the beading is measured and recorded by the machine. In this type of test the entire length of beading is installed at once and is removed at once.

In all the examples that follow, the embodiment of the present invention having two pair of opposed sheet engaging structures (FIG. 4) was tested. Prior art beading having two opposed downward sloping locking blades was also tested. The tested prior art beading was substantially identical to that disclosed in U.S. Pat. No. 3,167,856, issued to Zoller, which is hereby incorporated by reference. Both beadings were made of the same material, so both had the same coefficient of friction. Results of the tests were compared. The present invention proved easier to mount on each blade thickness tested, but no less difficult to remove. This is counter-intuitive because the present invention has twice as many legs as the tested prior art.

In the prior art, such as Zoller, their is no gap between the locking blades, or the locking blade and the opposing sidewall when the strip is unmounted and in its equilibrium state, whereas in a beading strip according to the present invention, there is a gap between these two surfaces when the strip is unmounted and in its equlibrium state. The size of the gap depends on the width of the blade or mounting surface that the trim beading strip is designed to be mounted on. It has been found that such a gap of appropriate dimension eases installation by decreasing the degree of displacement of the legs and feet required to mount the strip, while not significantly reducing the force required to remove the strip because rotation of the foot is required for removal. Thus, prior art typified by Zoller would not exhibit the same benefit from having such a gap which could be expected to decrease the force required to mount the strip, but would also decrease the force required to remove the strip.

In the first test, insertion of prior art beading on a 0.08 inch thick blade required 4.5 pounds, compared to 1.8 pounds for the present invention beading. In the second test, insertion of prior art beading on a 0.10 inch thick blade required 18.5 pounds, compared to 3.0 pounds for the present invention beading. In the third test, insertion of prior art beading on a 0.12 inch thick blade required 18.5 pounds, compared to 4.2 for the present invention. In the fourth test, insertion of prior art beading on a 0.14 inch thick blade required 16.5 pounds, compared to 15.0 pounds for the present invention beading. In each case the removal force for the present invention beading was greater than or equal to the removal force of the prior art beading. The following table summarizes the data and clearly demonstrates the superior performance of the present invention.

| Blade Thickness (inches) | 0.08 | 0.10 | 0.12 | 0.14 |
|---|---|---|---|---|
| Insertion force (pounds) | | | | |
| (a) Prior Art | 4.50 | 18.4 | 18.50 | 16.5 |
| (b) Present Invention | 1.8 | 3.0 | 4.2 | 15.0 |
| Removal Force (pounds) | | | | |
| (a) Prior Art | 13.0 | 18.0 | 22.0 | 21.0 |
| (b) Present Invention | 19.0 | 18.0 | 19.0 | 24 |

Naturally, the invention admits of modifications and variations that may be developed for specific applications. Referring to FIG. 10, there is illustrated an alternative embodiment of the beading profile strip 10 according to the present invention, having two opposed sheet engaging structures 16 instead of the four such structures illustrated in FIGS. 1 through 5. The operating of sheet engaging structures 16 illustrated in FIG. 10 is identical to that described in detail above.

Referring to FIG. 11, there is shown a beading profile strip 10 having two sheet engaging structures of the type previously described, both formed on one side of the channel 32 only. The two strip engaging structures 16 in FIG. 11 operate identically to the structures described in detail above. The configuration of FIG. 11 naturally results in an off-set appearance along the edge of a sheet 30. It is also easier to remove than the embodiment illustrated in FIGS. 1 through 5, but it nonetheless suitable for many applications.

The exact dimensions of beading profile strip 10, the width of the channel formed therein, and the length, thickness and so forth of legs 18 and feet 20, is a matter of choice that depends on the type of sheet the structure will be mounted on. The materials used to coat the metallic core 12 are also a matter of choice. Although it is often useful to choose a material having a high coefficient of friction, this is not always required because the sheet engaging structures according to the present invention are quite effective.

Of course, the present invention is not intended to be restricted to any particular form or arrangement, or any specific embodiment disclosed herein, or any specific use, since the present invention may be modified in various particulars or relations without departing from the scope or spirit of the claimed invention shown and described herein.

The invention has been described in considerble detail in order to comply with the patent laws by providing a full public disclosure of its forms. Such a detailed description is not, however, intended in any way to limit the broad features or principles of the invention, or the scope of the patent property to be granted.

| GLOSSARY |
|---|
| 10 Beading profile strip |
| 11 elongated strip |
| 12 metallic core |
| 13 parallel slits |
| 14 outer body |
| 15 welts |
| 16 sheet engaging structure |
| 18 leg |
| 19 ankle |
| 20 foot |
| 21 curved surface (of foot 20) |
| 22 straight line back (of leg) |
| 24 stop |
| 26 sidewall |
| 30 sheet |
| 32 channel |
| 34 end (of stop 24) |

What is claimed is:

1. A beading profile strip comprising:
   a. a semi-rigid rectilinear core formed into a U-shaped strip having a channel;
   b. a yielding resilient coating disposed about and covering said core forming a coated U-shaped strip having a channel;
   c. said coating U-shaped strip comprising a pair of limbs interconnected by an arcuate connecting member and an open portion opposite the arcuate connecting member;
   d. at least one leg integrally formed from said resilient coating and projecting from one limb of said coated U-shaped strip inwardly into the channel of the coated U-shaped strip and downwardly at an angle to the limb in a direction extending away from the open portion of the coated U-shaped strip, the leg running continuously throughout the length of said coated U-shaped strip and parallel to the longitudinal axis of said coated U-shaped strip;
   e. a foot attached to the leg at the innermost portion of the leg by a joining ankle;
   f. at least one stop integrally formed from said resilient coating and projecting from the same limb to which the leg is attached, the stop projecting inwardly into the channel of the coated U-shaped strip and downwardly at an angle to the limb in a direction extending away from the open portion of the coated U-shaped strip;
   g. said stop located adjacent to said leg but offset from it so that the stop is always further away from the arcuate connecting portion and closer to the open portion of the coated U-shaped strip; and
   h. said stop being shorter than said leg and said ankle of said leg being vertically aligned with the inwardly projecting end of said stop;
   i. whereby when a sheet is inserted into the channel through the open portion, the stop does not come in contact with the sheet and does not serve to retard entrance of the sheet and when the sheet is withdrawn from the channel, the stop acts as a fulcrum against which the ankle of the leg must pivot, allowing the foot to rotate upward, be compressed and squeezed between the sheet and stop to thereby provide a resistance force to retard the sheet from being withdrawn from the channel.

2. A beading profile strip in accordance with claim 1 wherein said stop is parallel to said leg.

3. A beading profile strip in accordance with claim 2 wherein said foot further comprises a curved outer surface which faces into the channel.

4. A beading profile strip in accordance with claim 3 wherein said leg, including said ankle and said foot, and said stop together comprise a sheet engaging structure, and said beading profile strip further comprises four said sheet engaging structures, with two first said sheet engaging structures disposed on one limb located to one side of said channel in spaced relation to each other, and the remaining two said sheet engaging structures disposed on the second limb located to the opposite side of said channel and opposing said first two sheet engaging structures.

5. A beading profile strip in accordance with claim 4 wherein a respective one of said first sheet engaging structures is located directly opposite a respective one of said remaining two sheet engaging structures and a gap is defined between opposed sheet engaging structures.

6. A beading profile strip in accordance with claim 3 wherein said leg, including said ankle and said foot, and said stop together comprise a sheet engaging structure, and said beading profile strip further comprises two said sheet engaging structures, with a first sheet engaging structure disposed on one limb located to one side of said channel, and the second sheet engaging structure disposed on the second limb located to the opposite side of said channel and opposing the first sheet engaging structure.

7. A beading profile strip in accordance with claim 6 wherein the first and second sheet engaging structures are located directly opposite each other and a gap is defined between the sheet engaging structures.

8. A beading profile strip in accordance with claim 3 wherein said leg, including said ankle and said foot, and said stop together comprise a sheet engaging structure, and said beading profile strip further comprises two said sheet engaging structures disposed on one limb located to one side of said channel in spaced relation to each other.

9. A beading profile strip in accordance with claim 3 wherein said leg, including said ankle and said foot, and said stop together comprise a sheet engaging structure, and said beading profile strip further comprises three said sheet engaging structures, with two first said sheet engaging structures disposed on one limb located to one side of said channel in spaced relation to each other, and the remaining said sheet engaging structure disposed on the second limb located to the opposite side of said channel and opposing said two first sheet engaging structures.

10. A beading profile strip in accordance with claim 9 wherein the remaining sheet engaging structure is located between said two first sheet engaging structures and a gap is defined between opposed sheet engaging structures.

11. A beading profile strip in accordance with claim 1 wherein said resilient coating is formed from a polymer and said semi-rigid core is formed of sheet steel.

12. A beading profile strip comprising:
 a. a yielding resilient core forming a U-shaped strip having a channel;
 b. said U-shaped strip comprising a pair of limbs interconnected by an arcuate connectng member and an open portion oposite the arcuate connecting member;
 c. at least one leg integrally formed from said resilient core and projecting from one limb of said U-shaped strip inwardly into the channel of the U-shaped strip and downwardly at an angle to the limb in a direction extending away from the open portion of the U-shaped strip, the leg running continuously throughout the length of said U-shaped strip and parallel to the longitudinal axis of said U-shaped strip;
 d. a foot attached to the leg at the innermost portion of the leg by adjoining ankle;
 e. at least one stop integrally formed from said resilient core and projecting from the same limb to which the leg is attached, the stop projecting inwardly into the channel of the U-shaped strip and downwardly at an angle to the limb in a direction extending away from the open portion of the U-shaped strip;
 f. said stop located adjacent to said leg but offset from it so that the stop is always further away from the arcuate connecting portion and closer to the open portion of the U-shaped strip; and
 g. said stop being shorter than said leg and said ankle of said leg being vertically aligned with inwardly projecting end of said stop;
 h. whereby when a sheet is inserted into the channel through the open portion, the stop does not come in contact with the sheet and does not serve to retard entrance of the sheet and when the sheet is withdrawn from the channel, the stop acts as a fulcrum against which the ankle of the leg must pivot, allowing the foot to rotate upward, be compressed and squeezed between the sheet and stop to thereby provide a resistance force to retard the sheet from being withdrawn from the channel.

* * * * *